Oct. 3, 1933.  C. BATCHELLER  1,929,301
FEEDING APPARATUS FOR PLASTIC MIXTURES
Filed Nov. 19, 1931  7 Sheets-Sheet 4
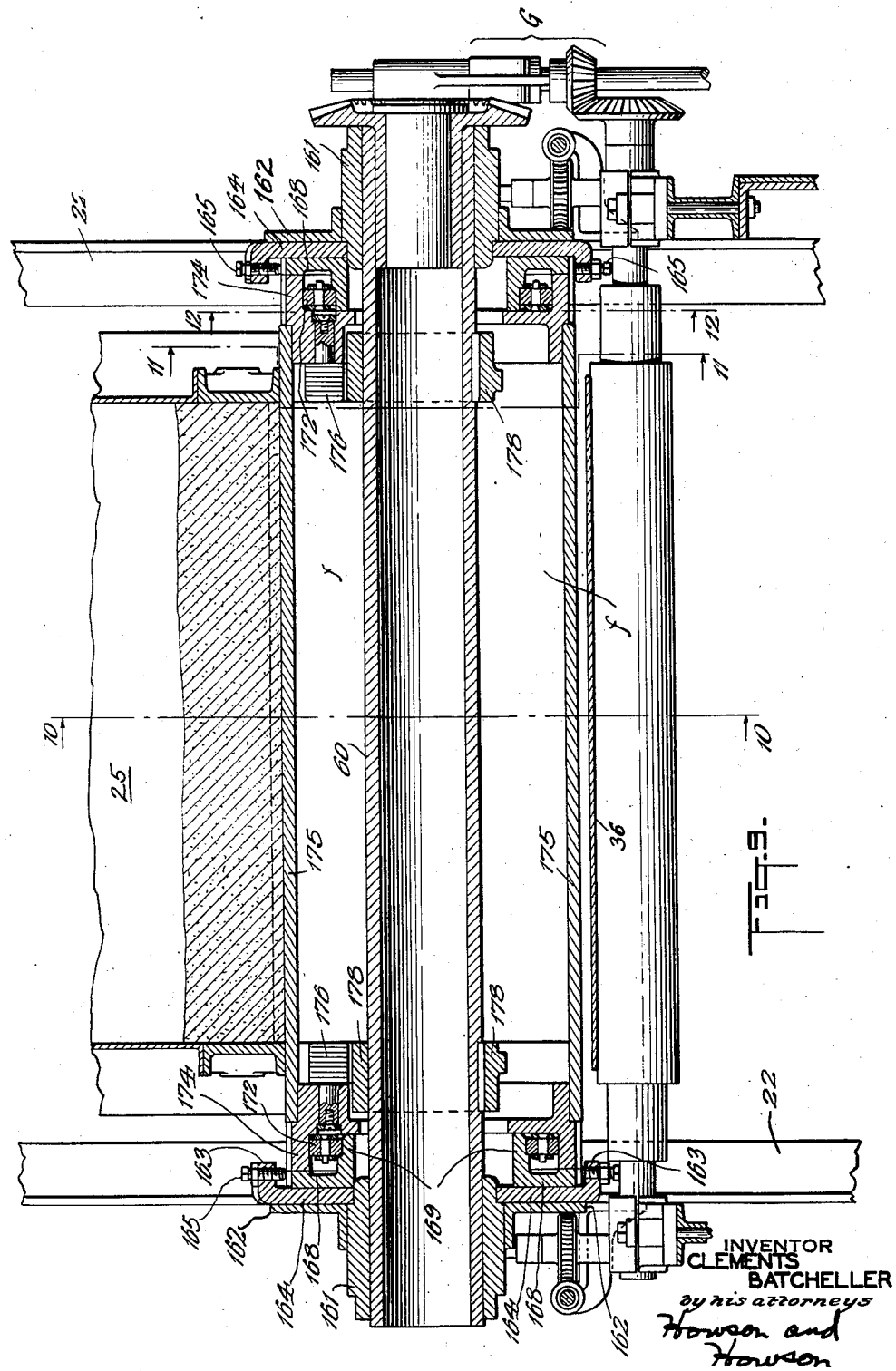
INVENTOR
CLEMENTS BATCHELLER
by his attorneys
Howson and Howson Oct. 3, 1933.  C. BATCHELLER  1,929,301
FEEDING APPARATUS FOR PLASTIC MIXTURES
Filed Nov. 19, 1931  7 Sheets-Sheet 5
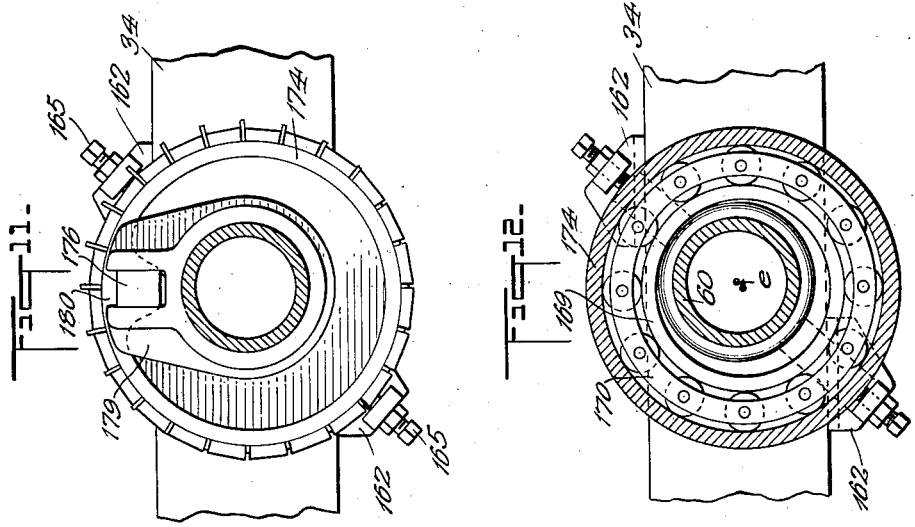
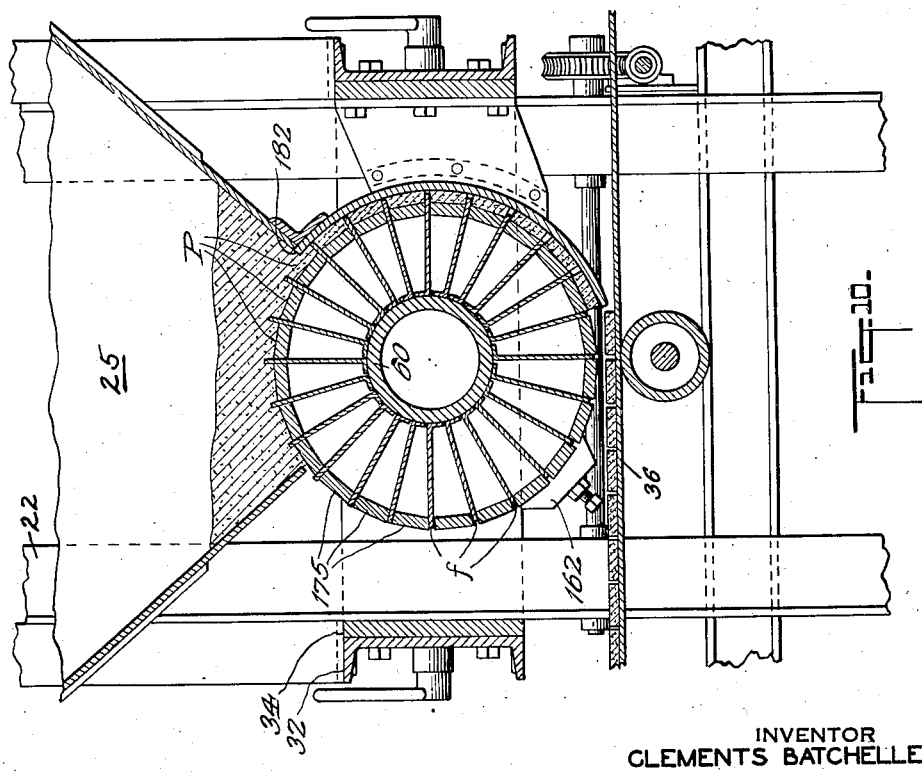
INVENTOR
CLEMENTS BATCHELLER
by his attorneys
Howson and Howson

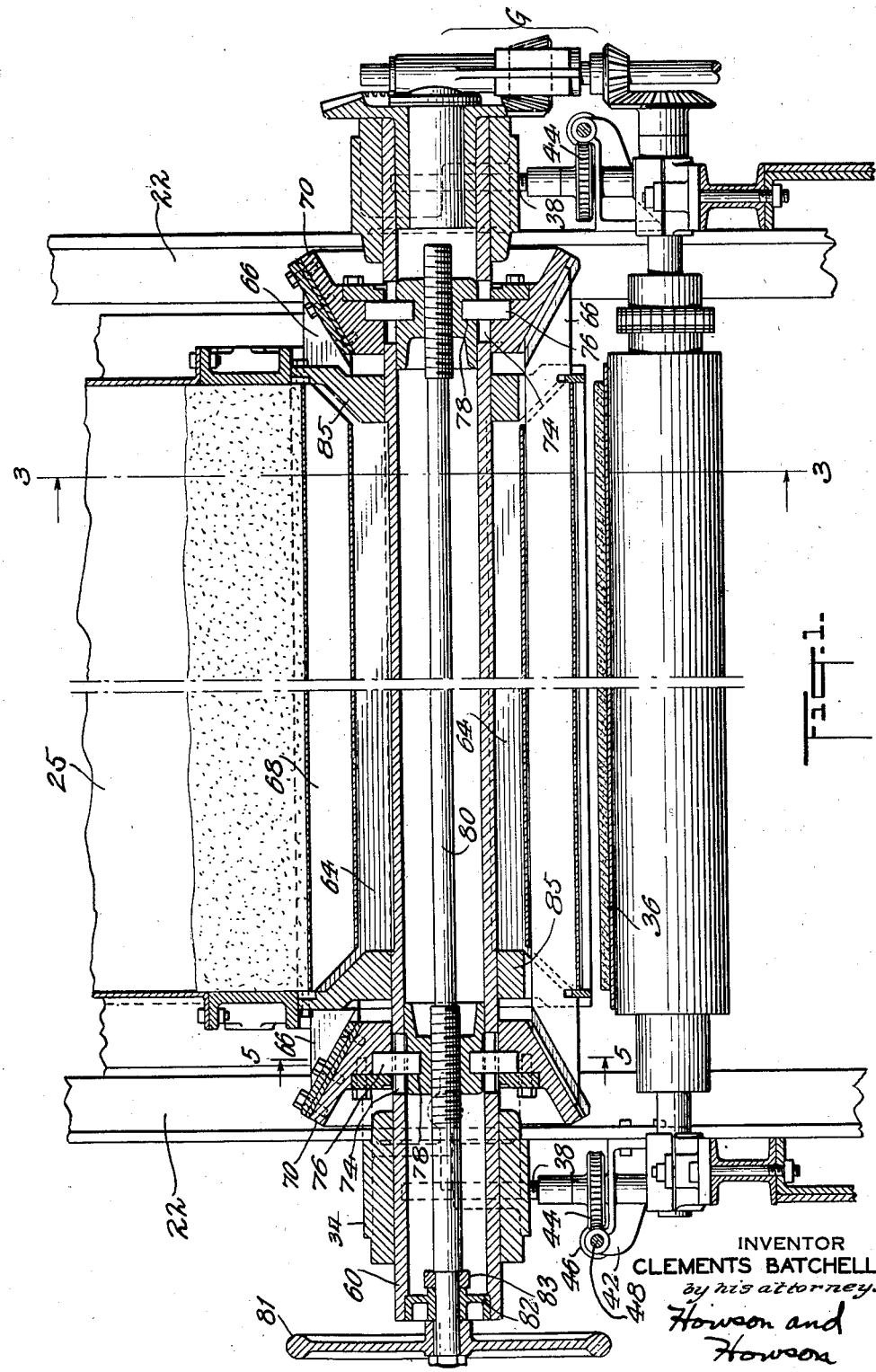

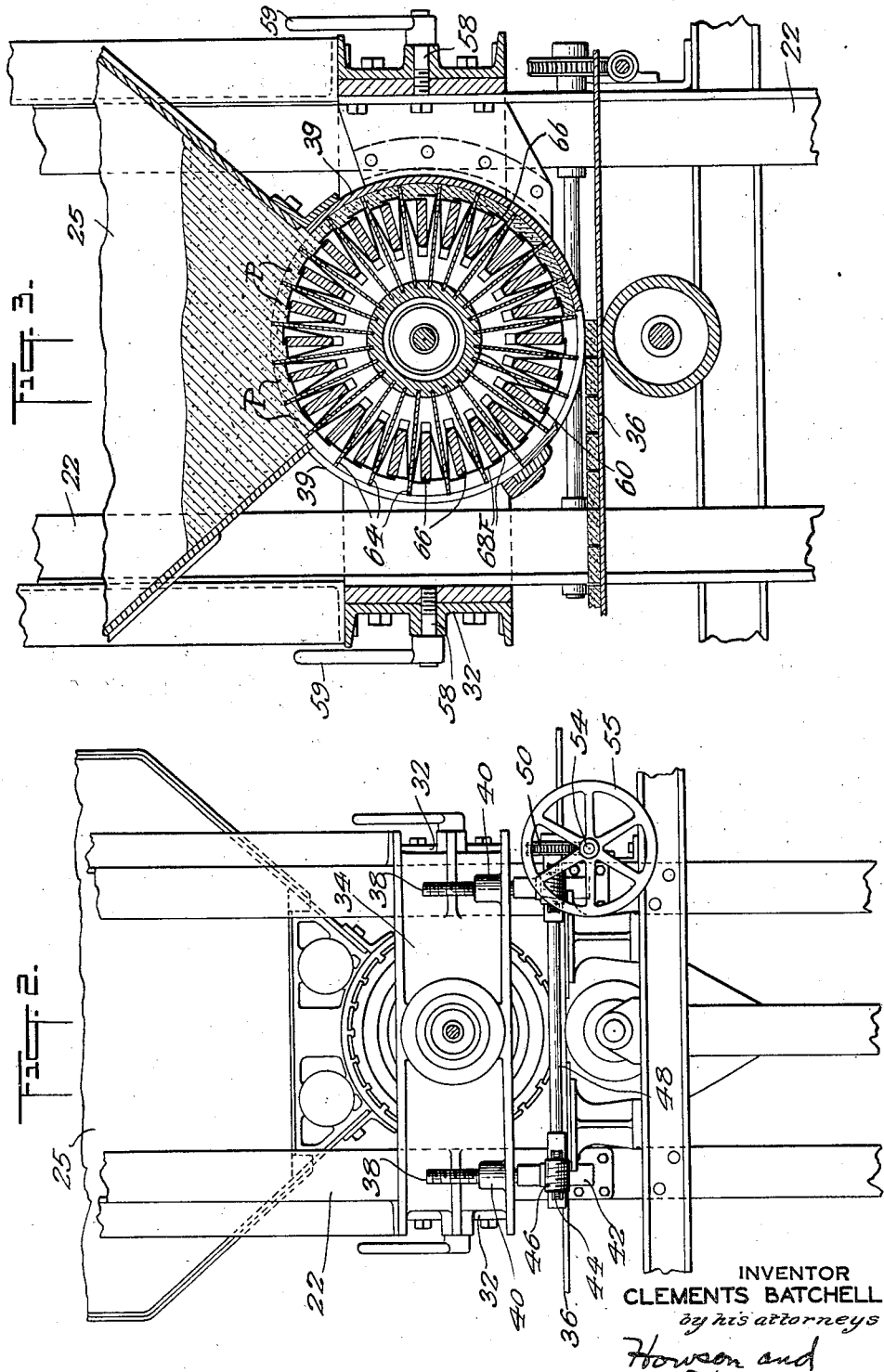

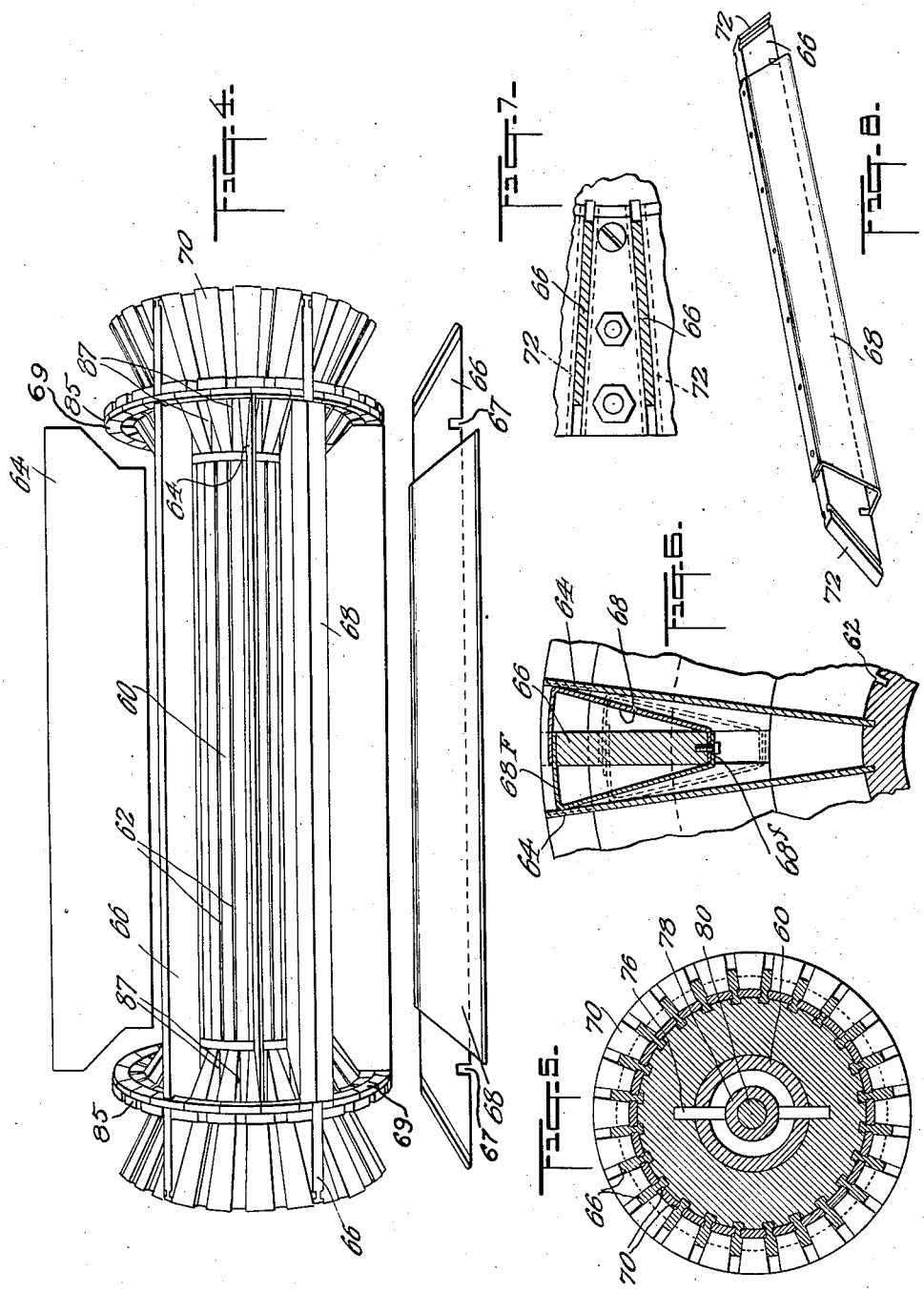

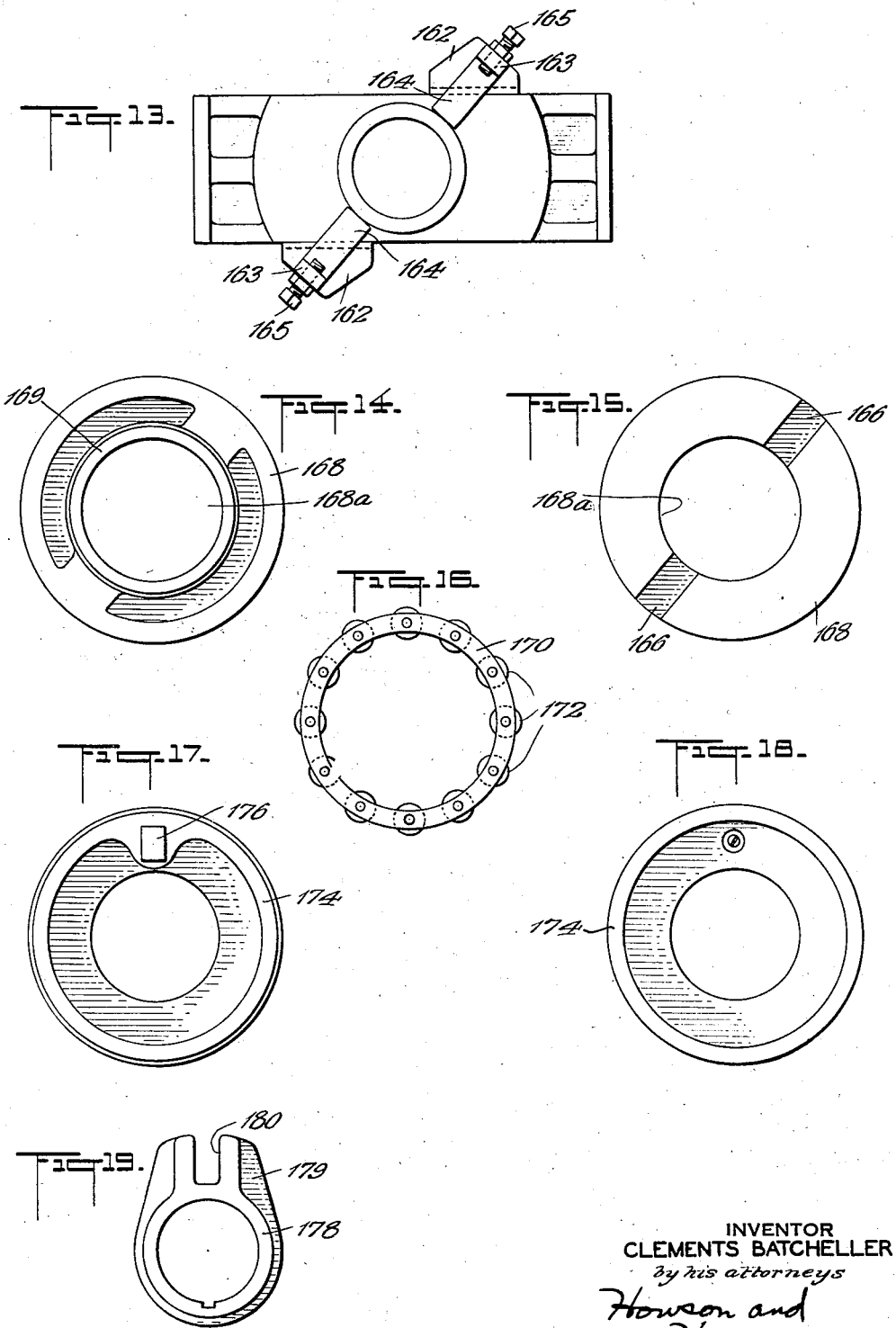

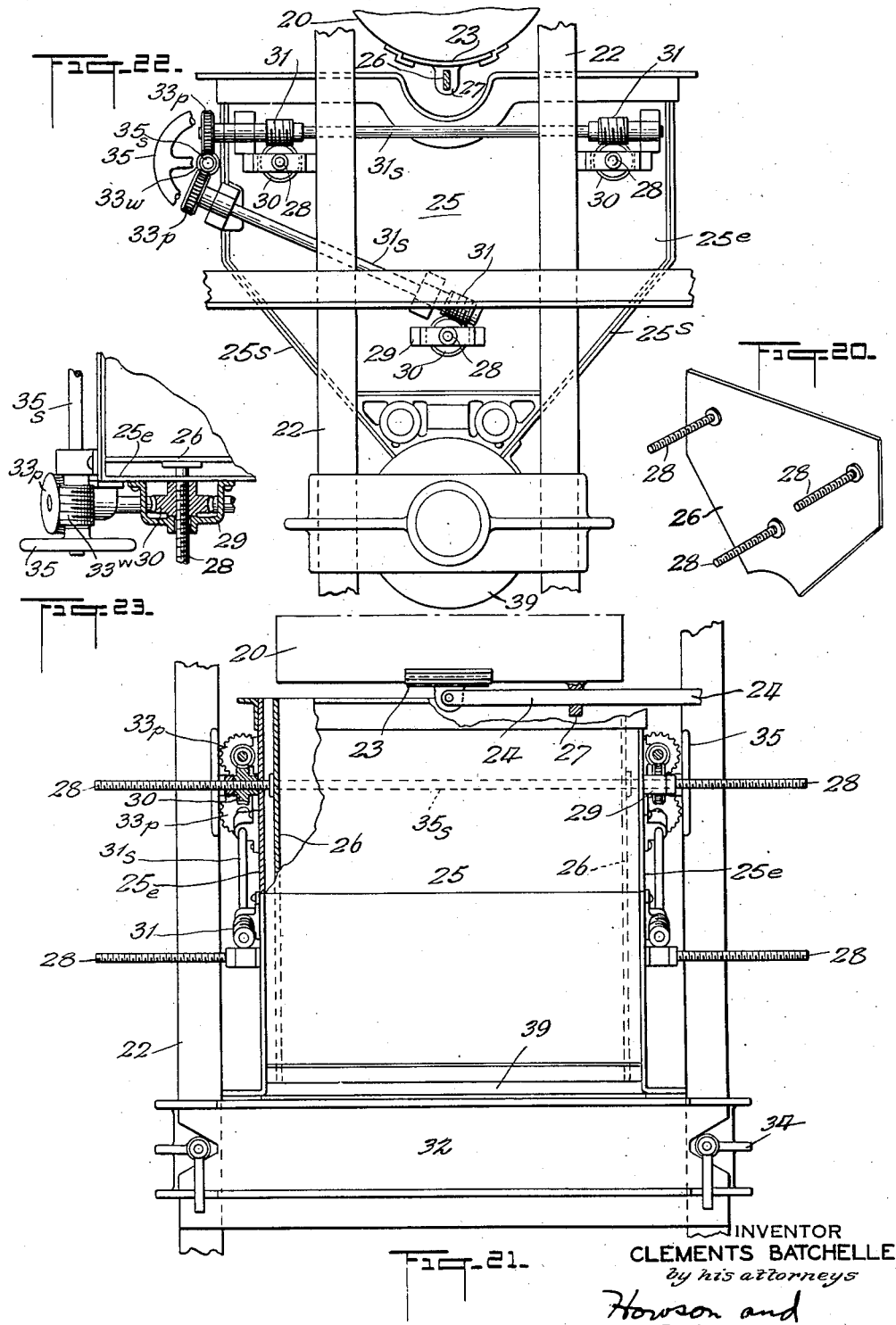

Patented Oct. 3, 1933

1,929,301

UNITED STATES PATENT OFFICE 1,929,301

FEEDING APPARATUS FOR PLASTIC MIXTURES

Clements Batcheller, Portsmouth, N. H., assignor to Bemis Industries, Incorporated, Boston, Mass., a corporation of Delaware Application November 19, 1931
Serial No. 576,173

24 Claims. (Cl. 25—103)

This invention relates to apparatus for depositing a layer of a plastic mixture on a moving platform, belt or the like. More particularly it relates to apparatus adapted for laying a series of slats or strips of a plastic mixture whose principal ingredients are fibrous materials and cementitious materials, upon a moving belt.

It is an object of this invention to provide an apparatus for depositing a continuous layer of a plastic mixture whose principal ingredients are cementitious and fibrous materials upon a moving conveyor.

Another object is to provide the aforementioned apparatus with means for varying the width of the layer which is deposited.

Another object is to provide means for varying the thickness of the layer deposited by the aforementioned apparatus.

Another object is to insure the continuous delivery of the plastic mixture to that part of the apparatus which deposits the mixture on the conveyor.

Another object is to provide means for positively removing the plastic mixture from that part of the apparatus which is designed to deposit the mixture on the conveyor.

Another object is to provide a revoluble device for taking a plastic mixture from a storing hopper and depositing it in layer form on a conveyor.

Another object is to provide means for depositing a plastic mixture on a conveyor in form of a layer composed of a series of parallel slats or strips.

Other objects and the advantages of my invention will appear as it is described in connection with the accompanying drawings.

The apparatus is particularly useful in carrying out the process and in forming the products described in my copending application, Serial No. 553,818 filed July 28th, 1931.

In the drawings:—

Fig. 1 is an elevation section view of one form of distributor made according to the principles of my invention. The section is taken on a longitudinal central plane through the distributor.

Fig. 2 is an end elevation of the invention as shown in Fig. 1.

Fig. 3 is a transverse section view of my invention as shown in Fig. 1 with the section taken on line 3—3 of Fig. 1.

Fig. 4 is an exploded perspective view of the distributor of Fig. 1, apart from its means of support.

Fig. 5 is a transverse section of the distributor as shown in Fig. 1 with the section taken on line 5—5 of Fig. 1.

Fig. 6 is a fragmentary detailed transverse section view of one of the pockets of the distributor shown in Fig. 1.

Fig. 7 is a detail view of one of the plates for holding the adjusting bars on the conical members of the distributor shown in Fig. 1.

Fig. 8 is a perspective view of an adjusting bar and sleeve used to regulate the depth of the pockets in the distributor shown in Fig. 1.

Fig. 9 is an elevation section view of a second form of distributor with the section taken on a central plane longitudinally of the distributor.

Fig. 10 is a transverse section view taken on line 10—10 of Fig. 9.

Fig. 11 is a transverse section view taken on line 11—11 of Fig. 9.

Fig. 12 is a transverse section view taken on line 12—12 of Fig. 9.

Fig. 13 is a detail view of the end bar of the distributor supporting frame used with the second form of my invention.

Figs. 14 and 15 are detail views of the two sides of the annular members used in the second form of my invention.

Fig. 16 is a detail view of a roller bearing used in the second form of my invention.

Figs. 17 and 18 are detail views of two sides of the bar-supporting rings used in the second form of my invention.

Fig. 19 is a detail view of one side of one of the collars that are used in the second form of my invention. The opposite side of this collar has the same appearance.

Fig. 20 is a perspective detail view of one of the movable sides of the storing hopper.

Fig. 21 is a broken, side elevation view of the stirring tank and storing hopper used in connection with the distributor.

Fig. 22 is an end elevation view of the apparatus shown in Fig. 21.

Fig. 23 is a broken, detail, plan view of the side moving mechanism for the storing hopper.

Referring to the drawings, the ingredient materials are dumped through an opening in the top of a cylindrical housing 20 which is secured to vertical posts 22 of the machine frame on each side of the apparatus. The axis of this housing is preferably horizontal and a helical stirrer (not shown) is employed to mix the ingredient materials in the housing. Any suitable mechanical means may be provided to actuate the stirrer.

An opening in the bottom of the mixer housing is provided with a slidable gate 23 which is normally closed but which may be opened to let the mixture fall into a hopper 25 located beneath the mixing apparatus. The gate 23 may be operated mechanically or by hand through the rod 24 which works in guide 27.

The hopper 25 has a rectangular upper part composed of vertical side and end walls and has a lower part composed of extensions of the end walls 25e and side walls 25s which converge downwardly to a cylindrical casing 39 in which is housed a distributor hereinafter more particularly described. The capacity of the housing 20 is calculated so that the hopper will hold enough mixture to feed continuously to the distributor while another batch is being mixed in the mixer. The hopper 25, distributor housing 39 and distributor are mounted upon a horizontal, rectangular frame comprising side and end members 32, 34 respectively which are movable vertically and are supported by the vertical posts 22 of the machine frame, as will hereinafter more fully appear.

Two forms of distributor are hereinafter described. In both forms the plastic mixture from the hopper 25 is taken by the distributor and is laid in a series of strips or slats of predetermined thickness, upon a conveyor belt 36 which passes continuously beneath the distributor.

The mixture used may have enough surplus water in it to give the strips enough fluidity to cause them to flow together or merge when they are laid on the belt and before they undergo the process described in my copending application Serial No. 553,818, filed July 28th, 1931. However, the degree of fluidity may be regulated to suit the particular treatment that the plastic is to undergo. Thus the present invention is not limited to the use of a mixture of any particular degree of fluidity.

It may be desirable under some conditions to lay the plastic on the distributor in a width narrower than the maximum width. Therefore I have provided the hopper with extra ends 26 which are movable and between which the mixed plastic is dropped and confined and let out to the distributor. Each end 26 lies parallel to the outer end 25e of the hopper and is of similar shape thereto. Each end 26 has three screw threaded rods 28 secured thereto at points approximately equally spaced from one another, and extending perpendicularly to the ends 26 and freely through apertures in the outer ends 25e. Over these apertures there are rotatably mounted within U-brackets 29 on the sides 25e internally threaded gear pinions 30 which cooperate with worm gears 31 on shafts 31s that are rotated through worm and worm pinion gearing 33w, 33p by the hand wheel 35. The ends 24 may be moved simultaneously by extending the hand wheel shaft 35s to connect with the mechanisms at both ends of the hopper.

The distributor is located between the hopper 25 and the conveyor belt 36, which carries the plastic deposited on it by the distributor, from beneath the distributor to other apparatus (not shown) for treating the plastic. Such apparatus is shown and claimed in my copending application S. N. 553,818.

As hereinbefore stated, the hopper and distributor are supported by the frame posts 22 through the horizontal frame 32—34.

The side bars 34 of the rectangular frame are U-shaped and each embraces the machine frame posts on one side of the machine. The ends of these bars 34 are connected by the side bars 32 and the whole frame is vertically adjustable on the machine frame posts 22 by means of four vertical threaded rods 38 turning in vertically bored and threaded studs 40 located on the side bars 34. The threaded rods 38 are held against vertical movement upon their supporting brackets 42 which are secured to the machine frame posts 22. At the lower ends of these rods 38 are worm pinions 44 which are engaged with worm gears 46 on a horizontal shaft 48 suitably supported from the posts 22. On one end of the rod 48 is a worm pinion 50 which engages with a worm gear on a horizontal shaft 54 running parallel to the distributor. Mechanism similar to that just described is provided on each side of the distributor and both mechanisms are operated by rotation of the shaft 54 by means of its hand wheel 55. Thus the distributor supporting frame 32—34 may be raised and lowered very readily.

In order to hold the distributor supporting frame in its adjusted position, the ends of screw threaded bolts 58 working in horizontal borings in the bars 32 are adapted to press against the machine frame posts 22 as the bolts 58 are rotated by their hand levers 59.

The distributor may be either in the form shown in Figs. 1–8 or the form shown in Figs. 9–20.

Referring to the form shown in Figs. 1–8, a hollow hub 60 is rotatably mounted horizontally in the end members 34 of the distributor or supporting frame and is provided with a plurality of longitudinally extending peripheral slots 62 into which are wedged plates or fins 64 which extend radially from the hub. The rotation of the hub may be accomplished through any suitable gear mechanism G. Between the fins 64 are adjustable devices which together with the fins form pockets P for reception of the plastic material, the fins forming the sides of the pockets and the adjustable devices forming the bottoms of the pockets. The adjustable devices comprise metal bars 66 which are supported at their ends for radial movement, as will hereinafter appear. Around the bars 66 and secured to the inner edges thereof are two-part sleeves 68 which serve as the bottoms of the pockets. These sleeves are each made up from two identical, resilient plates bent in channel form with one flange 68F longer than the other 68f, the angle of the long flange with the plate being acute and the angle of the short flange with the plate being oblique so that when the device is assembled it takes a wedge form. The short flanges are secured to the inner edges of the adjusting bars 66 but the long flanges are permitted to overlie the outer edges and slide upon one another in order that as the devices are moved radially between the fins toward and away from the hub 60 the sleeves will expand and contract thus making a wider or narrower bottom to suit the width of the lower portion of the pocket whether the pocket is deep or shallow.

In order to move the adjusting bars 66 toward and away from the hub 60 truncated conical, pocket-adjusting members 70 are slidably mounted on each end of the hub. The ends of each adjustment bar 66 are slidably connected with the conical faces of the conical members by dove tail mortise and tenon joints, the tenons 72 being formed on the end edges of the bars, which are cut obliquely, complementally to the conical faces of the cone members. Cone members 70 are connected by keys 76 with slidable pistons 78 within the hub. To permit axial sliding of the cone members and pistons relative to the hub, longitudinally extending slots 74 are cut in the hub for the keys 76.

To cause the pistons 78 and thereby the cone members to move along the hub 60 simultaneously, a rod 80 extends within and concentrically with the hub and through the pistons with which it has screw thread engagement. The rod need only be screw threaded at and near where it passes through the pistons since only a small amount of axial movement of the pistons is necessary to regulate the depth of the pockets. Obviously one of the screw threads must be right hand and the other left hand so that the pistons will move together or apart and not in tandem.

One end of the rod 80 is extended beyond the end of the hub and has a hand wheel 81 mounted thereon. This end of the rod is supported by a bearing 82 held in the end of the hub, the hand wheel 81 and a collar 83 engaging the bearing 82 on opposite sides in order to hold the rod from moving axially.

From the foregoing it will be obvious that rotation of the hand wheel 81 will cause the conical members 70 to move axially toward or away from each other thereby pushing the adjustment bars 66 and pocket bottoms 68 away from the hub 60 or pulling them toward the hub to shallow or deepen the pockets P. Fig. 6 shows the adjustment bar 66 and resilient wedge 68 in two positions of adjustment.

Due to the cutting away of a substantial portion of the metal at the ends of the adjustment bars 66 to form the tenons 72, and cutting away of the bars adjacent the two part sleeves 68 to form receses 67 for the segmental ring 69 (hereinafter described), the joint between the adjustment bars 66 and conical members 70 may not be as strong as is desirable when a thick layer of heavy plastic is to be laid by the distributor. Therefore, in order to support the adjustment bars, disc members 85 are fixedly mounted on the shaft near the conical members 70. The disc members have a series of radial slots 87 equal in width to the adjustment bars 66 and equal in number to the bars 66. As the bars 66 are adjusted they slide radially in the slots 87, and the bars are supported against circumferential displacement by the sides of the slots. To keep the plastic from spreading out the ends of the pockets P, segmental rings 69 are secured to the inner faces of the disc members 85 adjacent their peripheries and these rings fit into recesses 67 cut into the bars 66 for that purpose.

Referring now to the form of distributor shown in Figs. 9–19, the distributor is supported in the same way as before, that is by machine-frame posts 22 and the horizontal frame 32—34. The hollow hub 60 with the radially extending fins f thereon is rotatable in bearings 161 in the end bars 34 by means of appropriate gear mechanism G, as in the form of distributor previously described. Since the apparatus for supporting the hub 60 is the same at each end of the hub only one need be described. On the inside of the end bars 34 in diametrically opposite positions around the bearing preferably at an acute angle to the vertical is a pair of brackets 162 having guide portions 164 secured thereto and lying against the inside face of the bar 34 and adapted to fit into a pair of guideways 166 in an adjoining annular member 168 as will hereinafter more fully appear. The free ends 163 of the brackets 162 are turned at right angles to the guides 164 and have adjustment bolts 165 therein. These bolts engage at diametrically opposed points with the periphery of the annular member 168 whose central opening 168a is considerably larger than the diameter of the hub 60 passing therethrough, whereby the annular member may be positioned eccentrically to the hub 60. In order to insure rectilinear movement of the annular member during adjustment of its position and also to prevent its rotation, the diametrically oposed radial guideways 166 are cut in one face of the member 168 and slidably receive the guides 164 of the brackets 162. Integrally formed on the member 168 is a collar 169, the periphery of which is a bearing surface for an annular roller bearing 170. This roller bearing supports a ring 174 by virtue of the inner periphery of the ring bearing upon the rollers 172 of the roller bearing. To the outer periphery of the ring 174 are secured a plurality of bars 175 running parallel to the hub 60 and forming the bottom of the pockets P of which the radial fins f are the sides, the bars 175 being secured to the hub in any suitable manner. In order to cause the bar supporting ring 174 and the hub 60 to rotate together, a collar 178 with a slotted peripheral extension 179 is keyed to the hub 60, and a lug 176 projecting from the face of the ring member 174 engages in the slot 180 of the collar. The lug and slot connection permits the relative movement between the bar supporting ring 174 and collar 178 during the manipulation of the adjustment bolts 165 and during the rotation of the distributor.

From the foregoing it will be apparent that rotation of the hub 60 and collar 178 will cause rotation of the ring 174 upon the roller bearing 170. But since the position of the axis of the roller bearing and the annular member 168 on which the bearing rests is determined by the adjustment of bolts 165 the eccentricity e, (see Fig. 12) of the axis to the axis of the hub may be adjusted so that the bars 75 will move between the fins sufficiently to push the plastic out of the pockets at the proper time as the distributor rotates. Normally the discharge outlet of the hopper covers several pockets at once. It is desirable that each pocket should be deepest at the time it passes from under the tail edge 182 of the hopper discharge outlet. Therefore adjustment of the eccentricity should be along the diameter from said tail edge 182 to the axis of the hub and for that reason the guides 164 are located in that diameter, which is inclined to the vertical.

The depth of the pockets P may be regulated by regulation of the eccentricity, any variation in the eccentricity being accompanied by a corresponding variation in the pocket depth.

From the foregoing it will be apparent that upon manipulation of the screws 165 the axis of the annular member 168 may be located eccentric to the fixed axis of the hub 60 and thereby will the bearing 170, and ring 174 with its bars 175 be located with their axes eccentric to the hub axis. Because of the eccentricity of these axes and the location of the bars 175 between the fins f, the rotation of the hub 60, which through collars 178 and lugs 176 causes rotation of the rings 174 with bars 175, is accompanied by movement of the bars 175 inward and outward between the fins f thereby pushing the plastic out of pockets P at the bottom of the distributor and allowing the pockets to fill at the top of the distributor.

In the operation of both of the modifications described the plastic is mixed in the casing 20 for a predetermined time and then is let down into the hopper 25 by opening of the gate 23. Enough of the plastic will have been mixed to supply the distributor while another batch is being prepared and mixed. From the hopper the plastic is fed to the distributor. If a narrow layer is to be laid on the conveyor by the distributor the hand wheel 35 will be turned to move the sides 26 inward thus reducing the width of the mouth of the hopper. The distributor takes the plastic from the mouth of the hopper and lays it in parallel strips on the belt 36 for further treatment. Referring to the form shown in Figs. 1-8, if the layer is to be thick the handle wheel 81 will be rotated clockwise moving the pocket-adjusting members 70 outwardly along hub 60 and thereby moving the pocket bottoms 68 radially inward. If a thinner layer is to be laid the wheel 81 will be rotated counter clockwise to move the pocket-bottoms 68 radially outward. Referring to the form of invention shown in Figs. 9-19, if the layer is to be thin the bolts 165 will be adjusted to reduce the eccentricity of the hub 60 and the axis of the rings 174. If the layer is to be thicker the bolts will be adjusted in the opposite direction to increase the eccentricity of the hub 60 and the axis of the rings 174. Whether or not the layer is to be thin or thick the parallel strips will be pushed out of the pockets by reason of the relative movement between the fins f and bars 175. From the foregoing explanation of the operation of the construction of Figs. 9-19 it will be seen that the adjustable eccentric mounting of sides and bottoms of the pockets makes possible not only the forcing of the plastic from the pockets but also the variation of the thickness of the plastic layer.

My invention is particularly desirable because of its adaptability to many types of plastic materials and mixtures, and because of its simple and efficient way of depositing the plastic on the conveyor belt in a series of transverse parallel strips which can be readily merged into a composite layer.

It will be obvious to those skilled in the art that many other modifications and many changes within the scope of my invention may be made. Therefore I do not limit myself to the specific embodiments shown. Nor do I limit myself to any particular plastic mixture though the apparatus described is particularly useful in handling a mixture of cementitious and fibrous materials.

What is claimed is:

1. In a distributor for feeding a plastic mixture to a moving belt, a rotatable device having a plurality of parallel peripheral pockets, a plurality of movable devices forming the bottoms of said pockets, and means movable axially of the distributor for regulating the depth of said pockets.

2. In a distributor for feeding a plastic mixture to a moving belt, a rotatable hub, a plurality of radially extending fins, a plurality of radially movable devices located between said fins and with said fins forming pockets for the reception of plastic material, and means to adjust the position of said radially movable devices relative to said fins, thereby regulating the depth of said pockets.

3. In a distributor for feeding a plastic mixture to a moving belt, a rotatable device having a plurality of parallel peripheral pockets, a plurality of movable devices forming the bottoms of said pockets, and means to adjust the position of said radially movable devices, thereby regulating the depth of said pockets.

4. In a distributor for feeding a plastic mixture to a moving belt, a rotatable hub, a plurality of radially extending fins, a plurality of radially movable resilient devices located between said fins and with said fins forming pockets for the reception of the plastic mixture.

5. In a distributor for feeding a plastic mixture to a moving belt, a rotatable hub, a plurality of radially extending fins, a plurality of radially movable resilient sleeves located between said fins and with said fins forming pockets for the reception of the plastic mixture.

6. In a distributor for feeding a plastic mixture to a moving belt, a rotatable hub, a plurality of radially extending fins, a plurality of radially movable resilient devices located between said fins and with said fins forming pockets for the reception of the plastic mixture, bars cooperating with said resilient devices, and means movable axially of the distributor for regulating the depth of said pockets.

7. In a distributor for feeding a plastic mixture to a moving belt, a rotatable hub, a plurality of radially extending fins, a plurality of radially movable resilient sleeves located between said fins and with said fins forming pockets for the reception of the plastic mixture, and means to move said sleeves radially for regulating the depth of said pockets.

8. In a distributor for feeding a plastic mixture to a moving belt, a rotatable hub, a plurality of radially extending fins, a plurality of radially movable resilient devices located between said fins and with said fins forming pockets for the reception of the plastic mixture, bars cooperating with said resilient devices, and conical members engaging with said bars and movable axially to regulate the depth of said pockets.

9. In a distributor for feeding a plastic mixture to a moving belt, a rotatable hub, a plurality of radially extending fins, a plurality of radially movable resilient sleeves located between said fins and with said fins forming pockets for the reception of the plastic mixture, bars cooperating with said sleeves, and axially movable means for moving said bars to regulate the depth of said pockets.

10. In a distributor for feeding a plastic mixture to a moving belt, a rotatable hub, a plurality of radially extending fins, a plurality of radially movable resilient sleeves located between said fins and with said fins forming pockets for the reception of the plastic mixture, bars cooperating with said sleeves, axially movable conical members engaging with said bars to regulate the depth of said pockets.

11. In a distributor for feeding a plastic mixture to a moving belt, a rotatable hub, a plurality of radially extending fins, a plurality of radially movable resilient devices located between said fins and with said fins forming pockets for the reception of the plastic mixture, bars cooperating with said resilient devices, and conical members engaging with said bars and movable axially to regulate the depth of said pockets, and means affording lateral support to said bars.

12. In a distributor for feeding a plastic mixture to a moving belt, a rotatable hub, a plurality of radially extending fins, a plurality of radially movable resilient sleeves located between said fins and with said fins forming pockets for the reception of the plastic mixture, bars cooperating with said sleeves, axially movable conical members engaging with said bars to regulate the depth of said poskets, and members affording lateral support to said bars.

13. In a distributor for feeding a plastic mixture to a moving belt, a rotatable hub, a plurality of radially extending fins mounted thereon, a plurality of movable devices located between said fins and rotatable therewith, and rotatable means supporting said devices, the axis of said means being eccentric to the axis of rotation of said fins.

14. In a distributor for feeding a plastic mixture to a moving belt, a rotatable hub, means supporting the ends of said hub, a plurality of fins mounted on said hub, a plurality of devices movable between said fins, means carrying said devices and means engaged with said hub-supporting means but slidable thereon for supporting said carrying means.

15. In a distributor for feeding a plastic mixture to a moving belt, a rotatable hub, means supporting the ends of said hub, a plurality of fins mounted on said hub, a plurality of devices movable between said fins, means carrying said devices, means engaged with said hub-supporting means but slidable thereon for supporting said carrying means, and means secured to said hub for slidably engaging with said carrying means to cause rotation of said devices with said fins.

16. In a distributor for feeding a plastic mixture to a moving belt, a rotatable hub, means supporting the ends of said hub, a plurality of fins mounted on said hub, a plurality of devices movable between said fins, means carrying said devices, means engaged with said hub-supporting means but slidable thereon for supporting said carrying means, and means to adjust the position of said engaged means so that the axes of rotation of said fins and said devices will be eccentric.

17. In a distributor for feeding a plastic mixture to a moving belt, a rotatable hub, means supporting the ends of said hub, a plurality of fins mounted on said hub, a plurality of devices movable between said fins, means carrying said devices, means engaged with said hub-supporting means but slidable thereon for supporting said carrying means, and means secured to said hub and slidably engaging with said carrying means to cause rotation of said devices with said fins, and means to adjust the position of said engaged means so that the axes of rotation of said fins and said devices will be eccentric.

18. In a distributor for feeding a plastic mixture to a moving belt, a rotatable hub, means supporting the ends of said hub, a plurality of fins mounted on said hub, a plurality of devices movable between said fins, annular members adjustable secured to said hub-supporting means, ring members supported by said annular members and means causing said ring members to rotate with said hub.

19. An apparatus for feeding a plastic mixture having as ingredients cementitious and fibrous material, comprising a mixing tank, a hopper below said tank and a rotatable distributor below said hopper, said hopper having at least one movable wall for causing delivery of the mixture over a part or the whole width of said distributor at will.

20. An apparatus for feeding a plastic mixture having as ingredients cementitious and fibrous material, comprising a mixing tank, a hopper below said tank and a rotatable distributor below said hopper, said hopper having movable walls for causing delivery of the mixture over a part or the whole width of said distributor at will and means for simultaneously moving said walls toward or away from each other.

21. An apparatus for feeding a plastic mixture having as ingredients cementitious and fibrous material, comprising a mixing tank, a hopper below said tank and a rotatable distributor below said hopper, said hopper having movable walls for causing delivery of the mixture over a part or the whole width of said distributor at will, a plurality of threaded rods extending from said walls, means engaging with said rods for simultaneously moving said walls toward or away from each other.

22. An apparatus for feeding a plastic mixture having as ingredients cementitious and fibrous material, comprising a mixing tank, a hopper below said tank and a rotatable distributor below said hopper, a pair of movable walls within said hopper, and means to move said walls for causing delivery of the mixture over a part or the whole width of said distributor at will.

23. In a distributor for feeding a plastic mixture to a moving belt, a rotatable hub, a plurality of radially extending fins, a plurality of radially movable devices located between said fins and with said fins forming pockets for the reception of plastic material, and means for simultaneously adjusting the position of said radially movable devices, relative to said fins, thereby regulating the depth of said pockets.

24. In a distributor for feeding a plastic mixture to a moving belt, a rotatable device having a plurality of parallel peripheral pockets, a plurality of movable devices forming the bottoms of said pockets, and means for simultaneously adjusting the position of said radially movable devices, thereby regulating the depth of said pockets.

CLEMENTS BATCHELLER.